United States Patent [19]

Park

[11] Patent Number: 5,708,534

[45] Date of Patent: Jan. 13, 1998

[54] APPARATUS FOR ADJUSTING THE PROJECTING ANGLE OF A PROJECTION SYSTEM

[75] Inventor: Jun-Hyun Park, Seoul, Rep. of Korea

[73] Assignee: Daewoo Electronics Co., Ltd., Seoul, Rep. of Korea

[21] Appl. No.: 548,474

[22] Filed: Oct. 26, 1995

[30] Foreign Application Priority Data

Oct. 26, 1994 [KR] Rep. of Korea ............... 1994-27356

[51] Int. Cl.$^6$ .................... G02B 7/02; G02B 15/14
[52] U.S. Cl. .................... 359/822; 359/694
[58] Field of Search .................... 359/822, 694, 359/823, 826, 704

[56] References Cited

U.S. PATENT DOCUMENTS

| | | | |
|---|---|---|---|
| 5,497,272 | 3/1996 | Wun | 359/821 |
| 5,537,169 | 7/1996 | Park | 353/101 |
| 5,537,170 | 7/1996 | Lee et al. | 353/101 |
| 5,552,939 | 9/1996 | Tseng et al. | 359/821 |
| 5,586,818 | 12/1996 | Lee | 353/101 |
| 5,618,094 | 4/1997 | Lee | 353/101 |
| 5,631,776 | 5/1997 | Weigand et al. | 359/694 |
| 5,636,913 | 6/1997 | Park | 353/101 |

*Primary Examiner*—David C. Nelms
*Assistant Examiner*—Ricky Mack
*Attorney, Agent, or Firm*—Fish & Richardson P.C.

[57] ABSTRACT

Disclosed is an apparatus for adjusting the projecting angle of a projection system. A pair of tubes provided in parallel lengthwise and having supporting plates in the inner sides thereof, respectively; upper and lower facing brackets installed above and under the tubes, respectively, with a predetermined distance; device for transporting tube back and forth installed in the upper and lower brackets to transport the tubes back and forth, while moving back and forth; and device for transporting tube from side to side of which the center portion is combined with the device for transporting tube back and forth and of which the side portions are combined with the supporting plates, to transport the tubes from side to side while being widened and gathering together with respect to the center when the device for transporting tube back and forth moves, are included. The tubes can be adjusted back and forth, and from side to side simultaneously. The operation of the apparatus is advantageous.

7 Claims, 4 Drawing Sheets

APPARATUS FOR ADJUSTING THE PROJECTING ANGLE OF A PROJECTION SYSTEM

BACKGROUND OF THE INVENTION

1. Field of the Invention

The present invention relates to an apparatus for adjusting the projecting angle of a projection system, and particularly to an apparatus for adjusting the projecting angle of a projection system which can operate a pair of projectors simultaneously in a predetermined track using a single motor.

2. Description of the Prior Art

There are various kinds of three dimensional color projection systems and/or display systems. One peculiar approach has two projectors or display systems, where one projector provides a right eye display and the other a left eye display on a screen. Each display has its own polarization, for instance, "P" and "S", respectively. The viewer wears polarized glasses which let the eyes see a stereoscopic display for three dimensional viewing.

Generally, a stereoscopic apparatus is used to accomplish the above-mentioned stereoscopic display. This apparatus includes a pair of tubes provided in front of the screen keeping a predetermined distance. Each tube projects an object on a screen to overlap thereon and the overlapped images are perceived by the eyes through polarized glasses for three dimensional viewing. In this kind of three dimensional projection system utilizing the three-beam separating method, if the distances between the screen and the tubes, or even between the tubes, are not adjusted exactly, the two projected images through the tubes will be out of focus giving a mis-overlapped image on the screen, or not operating the image on the screen. This makes the viewer feel uncomfortable and tired.

In the above-mentioned three dimensional projection system, the tubes should be controlled for image adjustment and exact focusing. Conventionally, when the projected images through the tubes on the screen do not coincide with each other, or when the focus is not concentrated on one point owing to the unfitness of the distance between the screen and the tubes, the tubes must be adjusted to correct the projecting direction and the projecting angle to compensate for the inconsistency. In this case, the adjusting process is very complicated and inconvenient. Moreover, the adjusting process is carried out manually while looking at the image on the screen, and it requires an expert to perform this difficult task.

SUMMARY OF THE INVENTION

In view of the above-mentioned problems found in the conventional technique, an object of the present invention is to provide a novel apparatus for adjusting the projecting angle of a projection system, with which focusing of the projected images through the tubes on the screen and fitting of the images can be accomplished simultaneously by controlling each tube which is an element of the projection system moving back and forth and from side to side simultaneously in a predetermined track.

To accomplish the above-mentioned object of the present invention, there is provided in the present invention an apparatus for adjusting the projecting angle of a projection system comprising: a pair of tubes provided in parallel lengthwise and having supporting plates in the inner sides thereof, respectively; upper and lower facing brackets installed above and under the tubes, respectively, with a predetermined distance; first means for transporting the tubes back and forth, the first transporting means being installed in the upper and lower brackets to transport the tubes back and forth, while moving back and forth; and second means for transporting the tubes from side to side of which the center portion is combined with the first transporting means and of which side portions are combined with the supporting plates, to transport the tubes from side to side while being widened and gathering together with respect to the center when the first transporting means moves.

Preferably, the first transporting means comprises a driving pulley which is provided on the rear center portion of the lower bracket and is driven by a motor, a plurality of driven pulleys which are rotatable and are provided at the front upper portion of the lower bracket and at the front and rear portions of the upper bracket, feeding wire wound between the driving pulley and the driven pulleys forming a closed circuit to be transported back and forth according to the rotational direction of the driving pulley, and a pair of upper and lower supporting arms fixed onto the feeding wire, the arms moving back and forth according to the motion of the feeding wire, upper portion of the upper supporting arm is fined into a guiding hole on the upper bracket, and a lower portion of the lower supporting arm is fitted into a guiding rail on the lower bracket.

Particularly, projected portions are formed at the lower portion of the upper supporting arm and at the upper portion of the lower supporting arm, a screw tap is formed in the projected portion at the lower portion of the upper supporting arm, and a locking screw is formed on the projected portion at the upper portion of the lower supporting arm. The lengths of the guiding hole and the guiding rail are the same with or longer than the moving distance of the tubes back and forth.

Preferably, the second transporting means is obtained by cross combining a pair of guiding plates for transporting the tubes from side to side, which comprises, supporting arm inserting holes with a predetermined height in the center portion of the guiding plates for transporting the tubes from side to side, guiding pins projected from the front lower portions of the guiding plates for transporting the tubes from side to side and inserted into tracking grooves formed on the front portions of the lower bracket through leading longitudinal holes formed at the front lower portions of folded sides of the supporting plates, and fixing pins projected from the rear portions of the guiding plates for transporting the tubes from side to side and inserted into the pin inserting holes formed on the folded sides of the supporting plates.

The first transporting means and the second transporting means are combined by inserting the projected portions of the supporting arms into the supporting arm inserting holes.

According to the apparatus for adjusting the projecting angle of a projection system, a pair of tubes installed in parallel are closely connected by the first and second means for transporting them. Accordingly, the back and forth movement and the from side to side movement of the tubes can be adjusted simultaneously within a predetermined track by means of a single motor. Focusing and fining of the images projected on the screen can be accomplished simultaneously.

BRIEF DESCRIPTION OF THE DRAWINGS

The above object and advantages of the present invention will become more apparent by describing in detail a preferred embodiment thereof with reference to the attached drawings, in which:

FIGS. 4A and 4B illustrate the operating state of the apparatus for adjusting the projecting angle of a projection system according to the present invention, in which FIG. 4A illustrates the state when the tubes are being moved back and widened to both sides and FIG. 4B illustrates the state when the tubes are being moved forward and gathered together toward the center.

DESCRIPTION OF THE PREFERRED EMBODIMENT

A preferred embodiment of the apparatus for adjusting the projecting angle of the projection system according to the present invention will be described in detail referring to the attached drawings.

Figure 1:
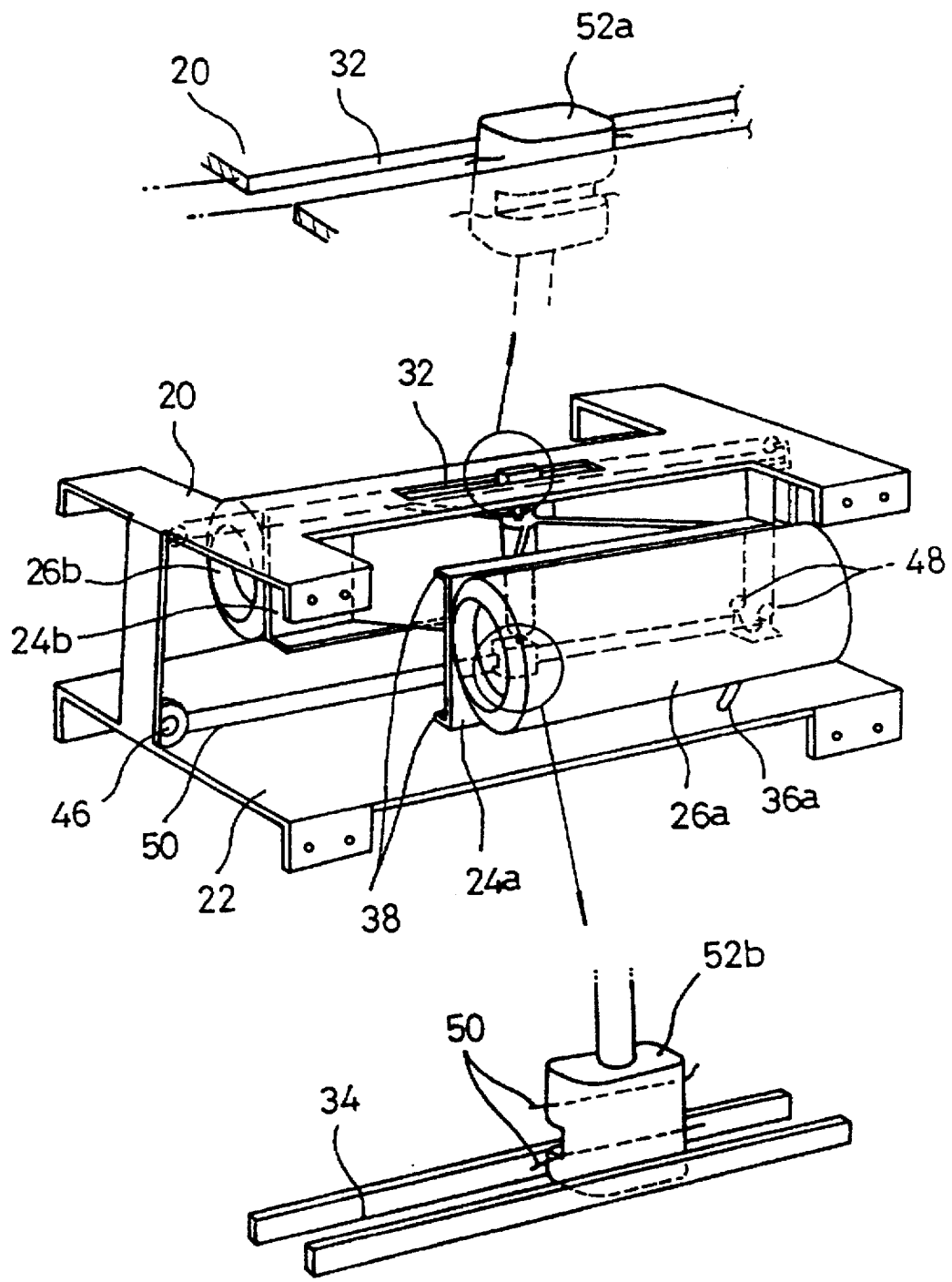
FIG. 1 is a schematic view of the apparatus for adjusting the projecting angle of a projection system according to the present invention.

FIG. 1 is a schematic view of the apparatus for adjusting the projecting angle of a projection system according to the present invention. The structure of the apparatus will be described roughly.

An upper bracket 20 and a lower bracket 22 facing upper bracket 20 are placed at a predetermined distance, and a pair of supporting plates 24a and 24b having a pair of tubes 26a and 26b at the outer surface thereof by means of a general attaching method such as molding, are provided in parallel within upper bracket 20 and lower bracket 22 and at the right and left sides of lower bracket 22. Preferably, upper bracket 20 and lower bracket 22 are connected at the center portions of both ends to support upper and lower brackets 20 and 22, while keeping a predetermined distance. At the center line within upper bracket 20 and lower bracket 22, a first transporting device 28 for transporting tube back and forth using a driving pulley 46, driven pulleys 48 and feeding wire 50 to transport tubes 26a and 26b back and forth is provided. Meanwhile, a second transporting device 30 for transporting tube from side to side which is combined with first transporting device 28 at the center portion thereof and is combined with supporting plates 24a and 24b within tubes 26a and 26b at the end portions thereof, is provided between tubes 26a and 26b to transport tubes 26a and 26b from right to left by widening and gathering together when first transporting device 28 moves back and forth.

A guiding hole 32 is formed at the longitudinal center line of upper bracket 20 having at least the same length as that of the transporting distance of tubes 26a and 26b back and forth. Correspondingly, a guiding rail 34 is formed on lower bracket 22 preferably having the same length with that of guiding hole 32. Meanwhile, a pair of calculated tracking grooves 36a and 36b are symmetrically formed at the right and left from portions on lower bracket 22.

Further, supporting plates 24a and 24b installed at the inner face of tubes 26a and 26b are bent inward at the upper and lower portions having the attached portion with tubes 26a and 26b as the center, to form folded sides 38. At the front ends of upper and lower folded sides 38, leading longitudinal holes 40a and 40b of which lengths are the same with the transporting distance of tubes 26a and 26b from side to side, are formed and at the rear ends of folded sides 38, pin inserting holes 42 are formed.

Figure 2:
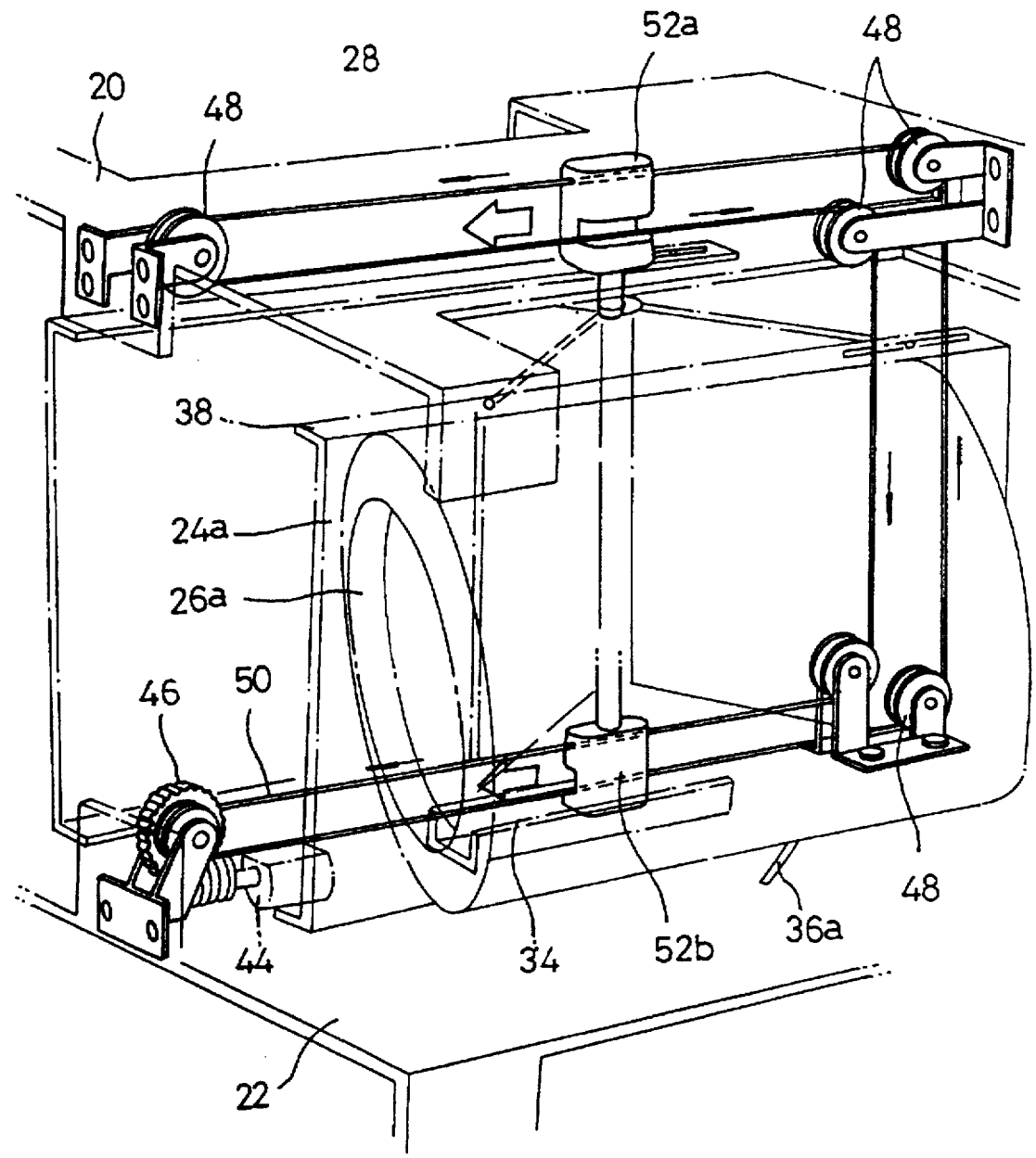
FIG. 2 is a partial perspective view of the apparatus for adjusting the projecting angle of a projection system according to the present invention to explain the first means for transporting the tubes back and forth.

FIG. 2 is an enlarged view of first transporting device 28 illustrated in FIG. 1. First transporting device 28 installed in upper and lower brackets 20 and 22 and at the center line of them, includes driving pulley 46 which is provided on lower bracket 22 at the center line thereof and could be driven by a common motor 44, a plurality of driven pulleys 48 which are rotatable and are provided at the front upper portion of lower bracket 22 and at the front and rear portions of upper bracket 20, feeding wire wound between driving pulley 46 and driven pulleys 48 forming a closed circuit to be transported back and forth according to the rotation direction of driving pulley 46, and a pair of upper and lower supporting arms 52a and 52b fixed on feeding wire 50, arms 52a and 52b move back and forth according to the motion of feeding wire 50, the upper portion of upper supporting arm 52a is fitted into a guiding hole 32 on upper bracket 20, and the lower portion of lower supporting arm 52b is fitted into a guiding rail 34 on lower bracket 22. At supporting arms 52a and 52b, projected portions are formed toward tubes 26a and 26b for the linkage of the arms with second transporting device 30. As shown in FIG. 2, if driving pulley 46 is driven counter-clockwise, feeding wire 50 fixed into supporting arm 52a which is inserted into guiding rail 34 on lower bracket 22 and feeding wire 50 fixed into supporting arm 52b which is inserted into guiding hole 32 are pulled to the left. Accordingly, supporting arms 52a and 52b are transported backward. Once, supporting arms 52a and 52b are transported backward, second transporting device 30 which is connected with the arms is also transported backward. Then, supporting plates 24a and 24b which are connected with device for transporting tube from side to side 30 are transported backward and tubes 26a and 26b which are attached to supporting plates 24a and 24b are also transported backward.

Figure 3:
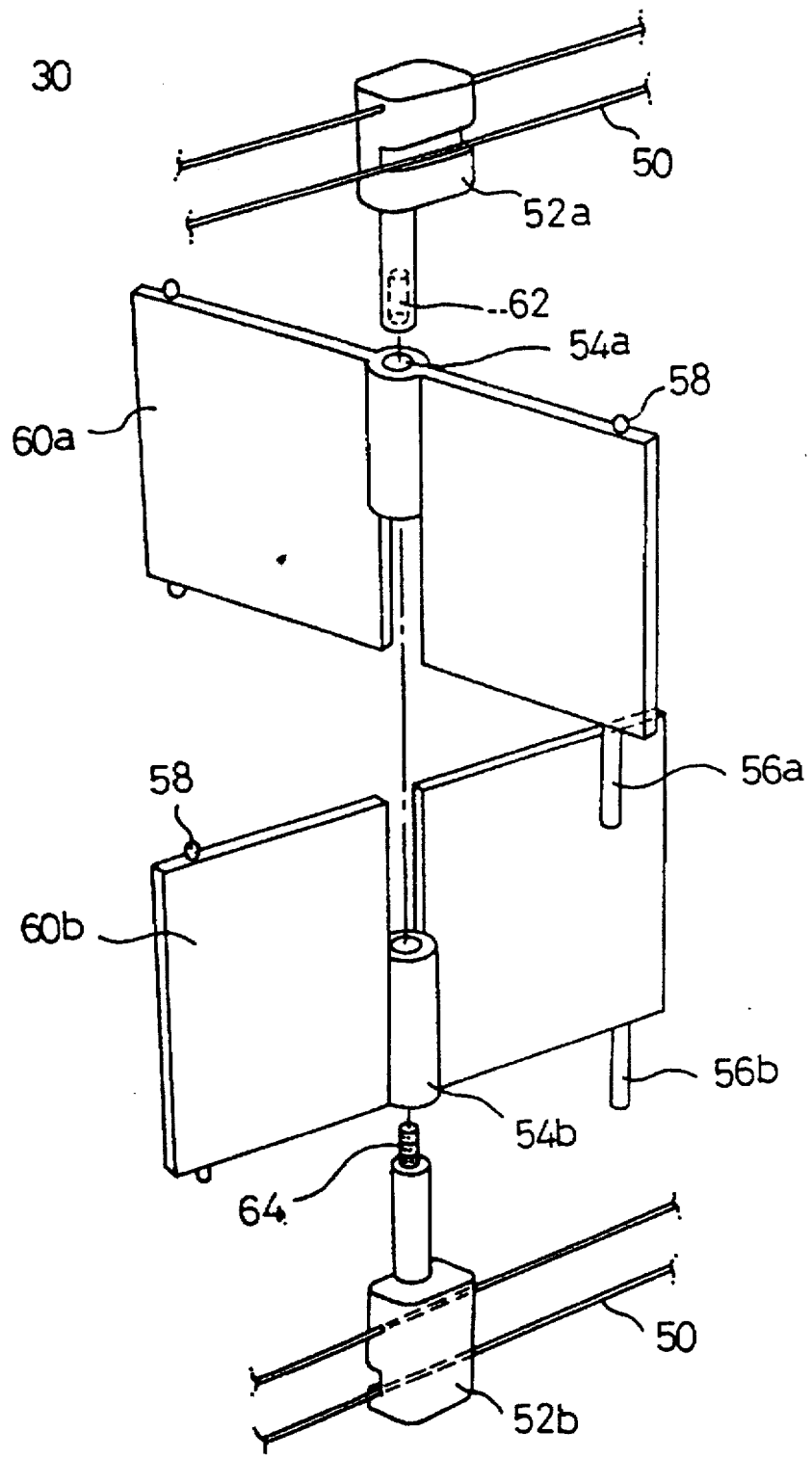
FIG. 3 is a partial perspective view of the apparatus for adjusting the projecting angle of a projection system according to the present invention to explain second means for transporting the tubes from side to side.

FIG. 3 illustrates a partial perspective view of second transporting device 30. The constitution and operation of second transporting device 30 will be described in detail below.

Second transporting device 30 consists of a pair of guiding plates for transporting the tubes from side to side 60a and 60b which are combined with the projected portions of supporting arms 52a and 52b which are elements of first transporting device 28 at the center portion, and are attached to supporting plates 24a and 24b at the end portions. Guiding plates for transporting the tubes from side to side 60a and 60b include supporting arm inserting holes 54a and 54b with a predetermined length in the center portion thereof, guiding pins 56a and 56b projected from the front lower portions of guiding plates for transporting the tubes from side to side 60a and 60b and inserted into tracking grooves 36a and 36b formed on the front portion of lower bracket 22 through leading longitudinal holes 40a and 40b formed at the front lower portion of folded sides 38 of supporting plates 24a and 24b, and fixing pins 58 projected from the front upper portions and the rear upper and lower portions of guiding plates for transporting the tubes from side to side 60a and 60b and inserted into pin inserting holes 42 formed on folded sides 38 of supporting plates 24a and 24b.

For cross combination of guiding plates for transporting the tubes from side to side 60a and 60b, supporting arms 52a and 52b of first transporting device 28 are formed separately as an upper and a lower one. A screw tap 62 is formed at the bottom of upper supporting arm 52a and a locking screw 64 is formed on lower supporting arm 52b to link supporting arms 52a and 52b with guiding plates for transporting the tubes from side to side 60a and 60b. At this time, upper supporting arm 52a and lower supporting arm 52b are combined through screw tap 62 and locking screw 64. Supporting arms 52a and 52b and guiding plates for transporting the tubes from side to side 60a and 60b are spaced apart with a constant distance and guiding plates for transporting the tubes from side to side 60a and 60b can move freely within the allowed range. Ultimately, first transporting device 28 and second transporting device 30 are connected to be operated using a single motor 44.

The operating principle of the apparatus for adjusting the projecting angle of the projection system according to the present invention will be described in detail below.

Figure 4A:
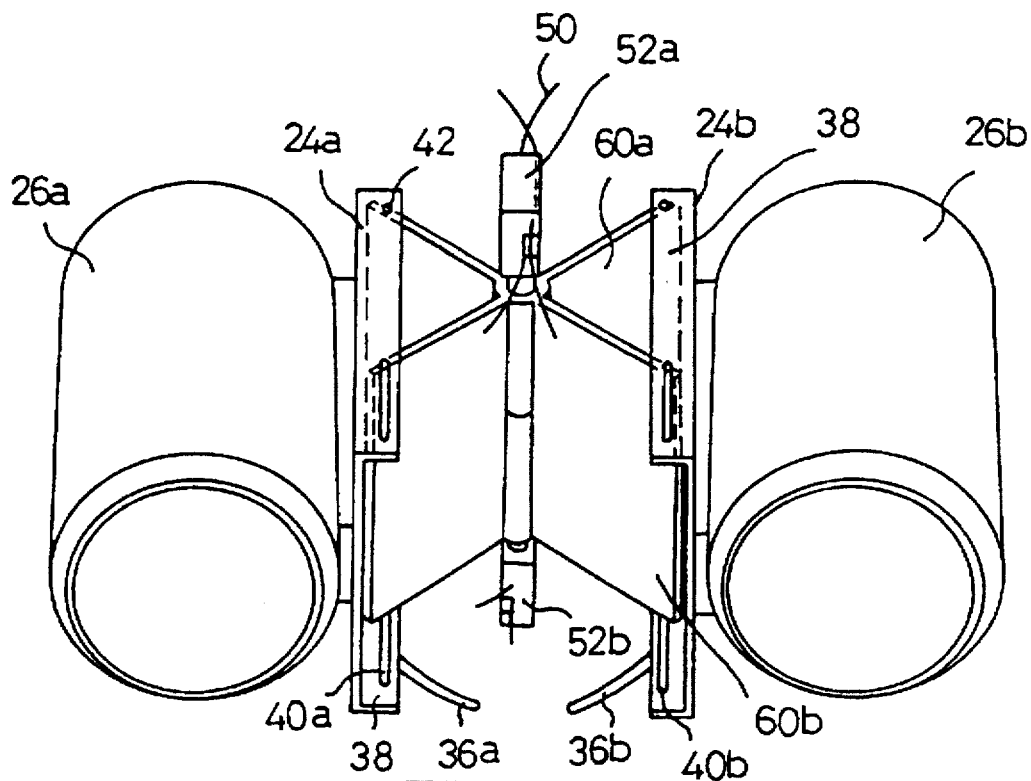
Figure 4B:
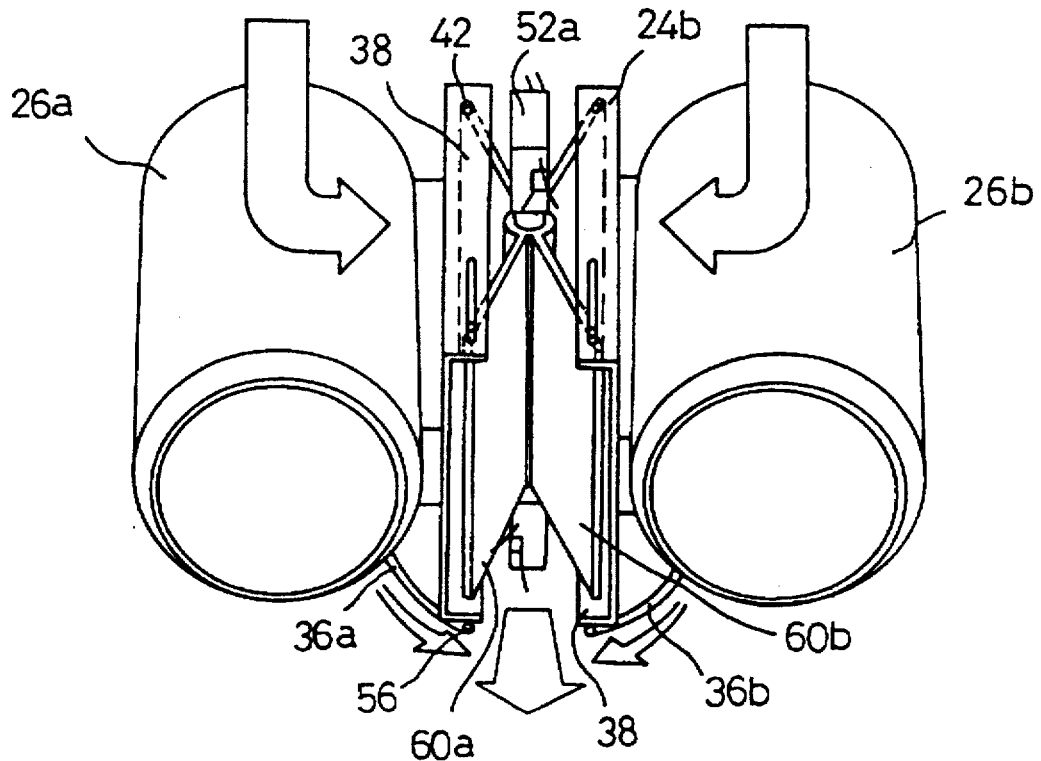

FIGS. 4A and 4B illustrate the operating state of the apparatus for adjusting the projecting angle of a projection system according to the present invention, in which FIG. 4A illustrates the state when the tubes 26a and 26b are being moved back and widened at both sides and FIG. 4B illustrates the state when the tubes 26a and 26b are being moved forward and gather together toward the center.

First, the state when the tubes 26a and 26b are being moved back and widened at both sides will be described referring to FIG. 4A. Leading longitudinal holes 40a and 40b are formed at front lower folded sides 38 of supporting plates 24a and 24b installed at the inner side of tubes 26a and 26b. Guiding pins 56a and 56b protrusively formed at front lower portions of a pair of guiding plates for transporting the tubes from side to side 60a and 60b which are cross combined through supporting arms 52a and 52b, are inserted into these leading longitudinal holes 40a and 40b to arrive at tracking grooves 36a and 36b on lower bracket 22. Fixing pins 58 projected from front upper portions and rear upper and lower portions of guiding plates for transporting the tubes from side to side 60a and 60b are inserted into a plurality of pin inserting holes 42 formed on folded sides 38 of supporting plates 24a and 24b. Among pin inserting holes 42, pin inserting holes 42 formed at the rear upper and lower portions of folded sides 38 are only for receiving fixing pins and could be formed, for example, as a semi-sphere shape. However, pin inserting holes 42 formed front upper portions of folded sides 38 are formed as holes having the same length as leading longitudinal holes 40a and 40b so that fixing pins 58 formed on the front upper portion of guiding plate for transporting from side to side 60a and 60b can move back and forth. At this state, if feeding wire 50 is moved backward by operating driving pulley 46 by means of motor 44, supporting arms 52a and 52b are moved backward and a pair of cross combined guiding plates for transporting the tubes from side to side 60a and 60b by supporting arms 52a and 52b are also moved backward within the length range of leading longitudinal holes 40a and 40b. As guiding pins 56a and 56b are moved backward along tracking grooves 36a and 36b, which are gathered together at the front portions and widened at the rear portions, tubes 26a and 26b are widened outward from the center line, while moving backward. At this time, the angle between guiding plates for transporting the tubes from side to side 60a and 60b keep the maximum angle.

Next, the state when the tubes 26a and 26b are being moved forward and gather together toward the center will be described in detail referring to FIG. 4A.

As shown in FIG. 4A, when tubes 26a and 26b are moved backward and feeding wire 50 is transported forward according to the driving of driving pulley 46, supporting arms 52a and 52b move forward and guiding plates for transporting the tubes from side to side 60a and 60b which are cross combined with supporting arms 52a and 52b also move forward. At the same time, guiding pins 56a and 56b formed on guiding plates for transporting the tubes from side to side 60a and 60b move along tracking grooves 36a and 36b. In this case, since tracking grooves 36a and 36b are gathering together as they move forward, tubes 26a and 26b are gathered together toward the center line, which is the opposite direction when they move backward.

The collective operation is as follows. When feeding wire 50 moves backward or forward by a single motor 44, supporting arms 52a and 52b which are fixed with feeding wire 50 comes to move backward or forward. And guiding plates for transporting the tubes from side to side 60a and 60b which are cross combined with supporting arms 52a and 52b also come to move backward or forward. Then, guiding pins 56a and 56b protrusively formed on guiding plates for transporting the tubes from side to side 60a and 60b and inserted into tracking grooves 36a and 36b through leading longitudinal holes 40a and 40b moves along the track. Finally, tubes installed within upper bracket 20 and lower bracket 22 in parallel by attaching them at the outer surface of supporting plates 24a and 24b move backward concurrently with outward or forward concurrently with inward.

In the apparatus for adjusting the projecting angle of the projection system according to the present invention, tubes can be transported back and forth concurrently with from side to side using a single motor. Accordingly, operation of the apparatus is advantageous and anyone who is not an expert can operate the apparatus easily.

While the present invention is described in detail referring to the attached embodiment, various modifications, alternate constructions and equivalents may be employed without departing from the true spirit and scope of the present invention.

What is claimed is:

1. An apparatus for adjusting the projecting angle of a projection system, said apparatus comprising:

a pair of tubes provided in parallel lengthwise and having supporting plates in inner sides of said tubes, respectively;

upper and lower facing brackets installed above and under said tubes, respectively, with a predetermined distance;

first means for transporting the tubes back and forth, said first transporting means being installed in said upper and lower brackets to transport said tubes back and forth, while moving back and forth; and second means for transporting the tubes from side to side of which the center portion is combined with said first means and of which the side portions are combined with said supporting plates, to transport said tubes from side to side while being widened and gathering together with respect to a center line when said first means moves.

2. The apparatus for adjusting the projecting angle of a projection system as claimed in claim 1, wherein said first means comprises:

a driving pulley which is provided on a rear center portion of said lower bracket and is driven by a motor;

a plurality of driven pulleys which are rotatable and are provided at a front upper portion of said lower bracket and at front and rear portions of said upper bracket;

feeding wire being wound between said driving pulley and said driven pulleys forming a closed circuit to be transported back and forth according to a rotational direction of said driving pulley; and a pair of upper and lower supporting arms fixed onto said feeding wire, said arms move back and forth according to a motion of said feeding wire, upper portion of said upper supporting arm is fitted into a guiding hole on said upper bracket, and a lower portion of said lower supporting arm is fitted into a guiding rail on said lower bracket.

3. The apparatus for adjusting the projecting angle of a projection system as claimed in claim 2, wherein projected portions are formed at a lower portion of said upper supporting arm and at an upper portion of said lower supporting arm, a screw tap is formed in said projected portion at a lower portion of said upper supporting arm, and a locking screw is formed on said projected portion at a upper portion of said lower supporting arm.

4. The apparatus for adjusting the projecting angle of a projection system as claimed in claim 2, wherein lengths of said guiding hole and said guiding rail are the same with or longer than a moving distance of said tubes back and forth.

5. The apparatus for adjusting the projecting angle of a projection system as claimed in claim 1, wherein said second means is obtained by cross combining a pair of guiding plates for transporting the tubes from side to side which comprises:

supporting arm inserting holes with a predetermined height in a center portion of said guiding plates for transporting the tubes from side to side;

guiding pins projected from front lower portions of said guiding plates for transporting the tubes from side to side and inserted into tracking grooves formed on front portions of said lower bracket through leading longitudinal holes formed at front lower portions of folded sides of said supporting plates; and fixing pins projected from rear portions of said guiding plates for transporting the tubes from side to side and inserted into pin inserting holes formed on said folded sides of said supporting plates.

6. The apparatus for adjusting the projecting angle of a projection system as claimed in claim 5, wherein said first means and said second means are combined by inserting projected portions of said supporting arms into said supporting arm inserting holes.

7. An apparatus for adjusting the projecting angle of a projection system comprising:

A) a pair of tubes provided in parallel lengthwise and having supporting plates in the inner sides thereof, respectively;

B) upper and lower facing brackets installed above and under said tubes, respectively, with a predetermined distance;

C) first means for transporting the tubes back and forth installed in said upper and lower brackets to transport said tubes back and forth, while moving back and forth, said first transporting means comprising 1) a driving pulley which is provided on a rear center portion of said lower bracket and is driven by a motor 2) a plurality of driven pulleys which are rotatable and are provided at a front upper portion of said lower bracket and at front and rear portions of said upper bracket 3) feeding wire being wound between said driving pulley and said driven pulleys forming a closed circuit to be transported back and forth according to a rotational direction of said driving pulley and 4) a pair of upper and lower supporting arms fixed onto said feeding wire, said arms move back and forth according to a motion of said feeding wire, upper portion of said upper supporting arm is fitted into a guiding hole on said upper bracket, and lower portion of said lower supporting arm is fitted into a guiding rail on said lower bracket, projected portions are formed at the lower portion of said upper supporting arm and at the upper portion of said lower supporting arm, a screw tap is formed in said projected portion at a lower portion of said upper supporting arm, and a locking screw is formed on said projected portion at an upper portion of said lower supporting arm, and the lengths of said guiding hole and said guiding rail are the same with or longer than the moving distance of said tubes back and forth; and D) second means for transporting the tubes tube from side to side of which center portion is combined with said first means by inserting projected portions of said supporting arms into said supporting arm inserting holes, and of which side portions are combined with said supporting plates, to transport said tubes from side to side while being widened and gathering together with respect to a center line when said fist means moves, said second means is obtained by cross combining a pair of guiding plates for transporting the tubes from side to side, which comprises:

supporting arm inserting holes with a predetermined height in a center portion of said guiding plates for transporting the tubes from side to side;

guiding pins projected from a front lower portions of said guiding plates for transporting the tubes from side to side and inserted into tracking grooves formed on front portions of said lower bracket through leading longitudinal holes formed at front lower portions of folded sides of said supporting plates; and fixing pins projected from a rear portions of said guiding plates for transporting the tubes from side to side and inserted into pin inserting holes formed on said folded sides of said supporting plates.

\* \* \* \* \*